United States Patent [19]

Gans et al.

[11] Patent Number: 5,403,034
[45] Date of Patent: Apr. 4, 1995

[54] H-RIB FASTENER FOR DETACHABLY FASTENING AN AIRBAG COVER TO A VEHICLE INSTRUMENT PANEL

[75] Inventors: Russell S. Gans, Westland; Kenneth E. Keck, Sterling Heights, both of Mich.

[73] Assignee: Morton International, Inc., Chicago, Ill.

[21] Appl. No.: 281,936

[22] Filed: Jul. 28, 1994

[51] Int. Cl.⁶ .............................................. B60R 21/16
[52] U.S. Cl. ................................. 280/728 B; 280/732; 403/294
[58] Field of Search .................... 280/728 B, 731, 732, 280/728 R, 728 A; 24/455, 458, 460, 461; 403/294, 292, 329

[56] References Cited

U.S. PATENT DOCUMENTS

| | | | |
|---|---|---|---|
| 4,158,512 | 6/1979 | Hassalhacher | 403/294 |
| 4,927,287 | 5/1990 | Ohkawa et al. | 24/458 X |
| 5,199,739 | 4/1993 | Fujiwara et al. | 280/732 |
| 5,209,510 | 5/1993 | Mamiya | 280/732 |
| 5,211,421 | 5/1993 | Catron et al. | 280/728 |
| 5,217,254 | 6/1993 | Satoh | 280/732 |
| 5,275,432 | 1/1994 | Pray et al. | 280/728 B |
| 5,333,897 | 8/1994 | Landiz et al. | 280/731 X |
| 5,335,937 | 8/1994 | Aphreae et al. | 280/732 X |
| 5,342,090 | 8/1994 | Sobczak et al. | 280/732 |

FOREIGN PATENT DOCUMENTS

| | | | |
|---|---|---|---|
| 4-243646 | 8/1972 | Japan | B60R 21/20 |
| 03-227753 | 10/1991 | Japan | B60R 21/20 |
| 2246983 | 2/1992 | United Kingdom | 280/728 B |

Primary Examiner—Margaret A. Focarino
Assistant Examiner—Christopher P. Ellis
Attorney, Agent, or Firm—George W. Rauchfuss, Jr.; Gerald K. White

[57] ABSTRACT

A fastener is provided using an H-rib head which slides into place in a channel molded on a detachable door mounted on a vehicular instrument panel covering an inflatable airbag. The H-rib fastener has a mounting shank extending downward therefrom which is adapted to fit in a hole in a mounting substrate on the instrument panel. A resilient clip is mounted on the mounting shank of the H-rib for insertion into one of the holes in the mounting substrate for locking the fastener in place in the mounting substrate. Upon deployment of the airbag, the door is pushed out of the dashboard surface with the H-shaped connector detaching from the channel in the door. Accordingly, only a low lying channel remains on the backside of the door, thereby minimizing the potential of a snagged airbag. The fastener can also be released simply by pressing the clip fastener together to release the H-rib fastener from the instrument panel to gain access to the airbag assembly in order to service the airbag assembly if desired.

13 Claims, 2 Drawing Sheets

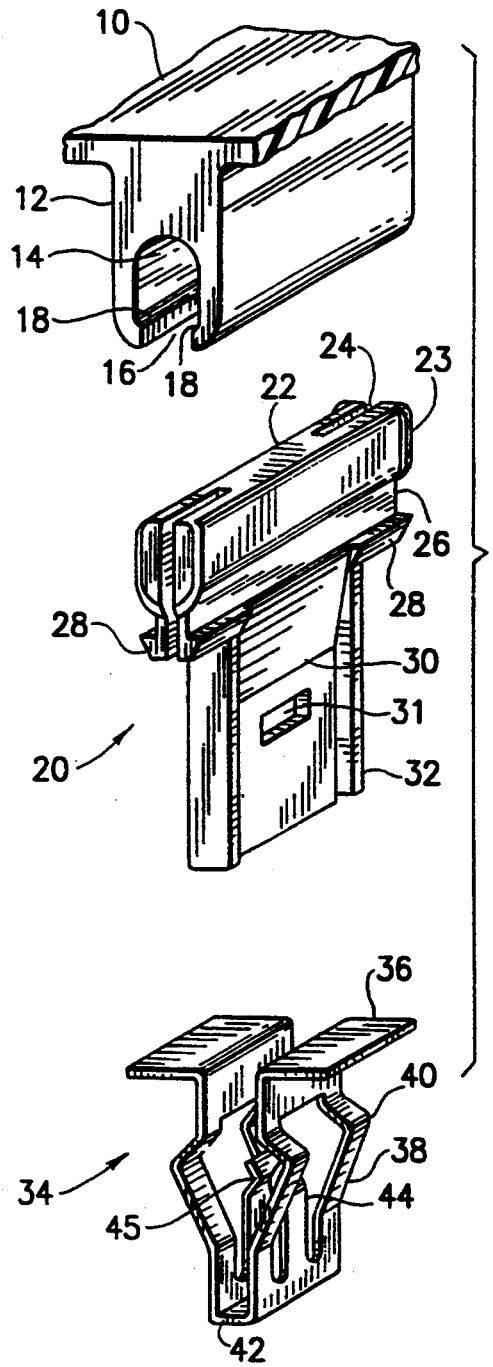
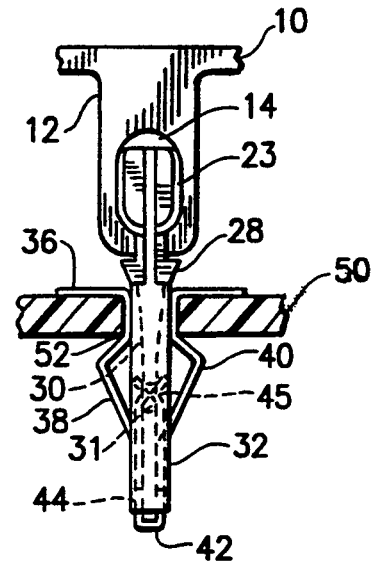
FIG. 2
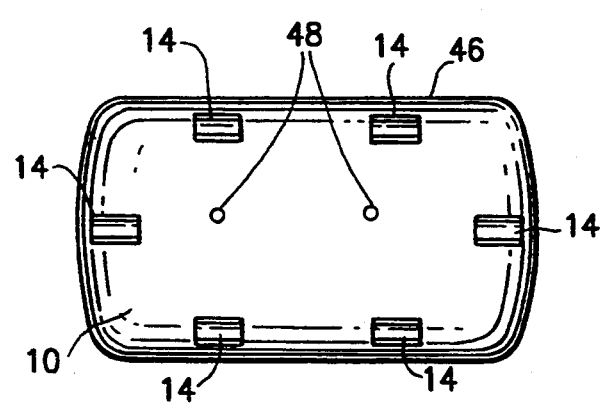
FIG. 3
FIG. 1

H-RIB FASTENER FOR DETACHABLY FASTENING AN AIRBAG COVER TO A VEHICLE INSTRUMENT PANEL

BACKGROUND OF THE INVENTION

This invention relates to a vehicular inflatable airbag assembly, and more particularly to an H-rib fastening assembly for mounting an airbag cover door over an airbag assembly installed in an instrument panel of a vehicle.

Most passenger vehicles employ inflatable restraints in the form of airbags for the vehicle driver and many are equipped with airbags for the front seat passenger. The passenger airbag assembly includes an inflator and reaction canister located in a recess in the vehicle instrument panel with the airbag deploying through an opening in the instrument panel. The opening is normally provided with a cover door which is designed to open on the deployment of the airbag. The door may be a separate rectangular shape that is flushly mounted in a rectangular opening so that it can be opened and completely removed by the deploying airbag. Such a door is usually attached to the instrument panel by a hinge or by a tether to cause the door to swing open and out of the path of the deploying airbag. Of necessity, the door must be releasably installed in the instrument panel opening so that it completely separates and moves out of the way of the airbag but at the same time must remain attached to the instrument panel so that it does not become a hazard for the occupant when the airbag opens. Accordingly, the opening door must remain attached in some way to the instrument panel and yet at the same time stay out of contact with the opening airbag so that the airbag will not snag and will fully inflate. Thus, it is also important that the fastening means for holding the door in the instrument panel do not become detached during the deployment of the airbag and remain in the instrument panel in a manner such that the fastening means do not interfere with the inflation of the airbag.

It would also be desirable to be able to gain access to the airbag assembly for servicing purposes even when the airbag is not in the process of inflation.

SUMMARY OF THE INVENTION

Accordingly, it is an object of this invention to provide a new and improved fastening means for releasably securing an airbag cover door to an instrument panel which is simple in construction, easy to install, and reliably positions and releases an airbag cover door from the instrument panel when the airbag is inflated.

Still a further object of this invention is to provide a new and improved fastener for a releasable door covering an inflatable airbag assembly in an instrument panel which fastener is snapped in and locked in the instrument panel but which can be manually released for gaining access for servicing the airbag system.

Still another object of this invention is to provide a new and improved fastening structure for mounting a door in the instrument panel of a vehicle, which door covers an inflatable airbag, utilizing molded channels in the door which accommodate the positioning of the fastening means therein from either end of the channel thereby facilitating the positioning of the door in the instrument panel.

Yet another object of this invention is to provide a new and improved fastening means for a releasable door covering an airbag system mounted in an instrument panel which does not interfere with the inflation of the airbag or provide a hazard to the vehicular passenger and is reusable.

In carrying out this invention in one illustrative embodiment thereof, an H-rib fastener is provided for detachably fastening an airbag cover having a rear surface substrate containing a plurality of slotted channels extending therefrom which are open at each end. The cover is mounted on a mounting substrate in a vehicle instrument panel which has a plurality of holes therein. The fastener has an H-rib shaped head which is adapted to slide into a slotted channel through either end thereof. The fastener has a shank extended downwardly from the H-rib shaped head, said shank adapted to position the fastener in a hole in the mounting substrate of the instrument panel. A resilient clip means having engagement means is mounted for engagement with the shank of the H-rib fastener for preventing the clip from pulling off of the shank. The clip is adapted to be inserted into a hole in the mounting substrate of the instrument panel along with the shank on which the clip is mounted for locking the H-rib fastener in place in the instrument panel.

BRIEF DESCRIPTION OF THE DRAWINGS

The invention, together with further objects and advantages, features and aspects thereof will be more clearly understood from the following description taken in connection with the accompanying drawings.

FIG. 1 is an exploded view of the H-rib fastener along with the molded channel in the releasable door in which the fastener is positioned.

FIG. 2 is an end view of the fastening structure shown in FIG. 1 illustrating the mounting and locking in of the fastening means in a partial cross-sectional view of an instrument panel substrate.

FIG. 3 is a rear view of an illustrative configuration utilizing a plurality of channels and tethering mounting areas on the rear of a cover door of the type utilized in the present invention.

DESCRIPTION OF THE PREFERRED EMBODIMENTS

Figure 4:
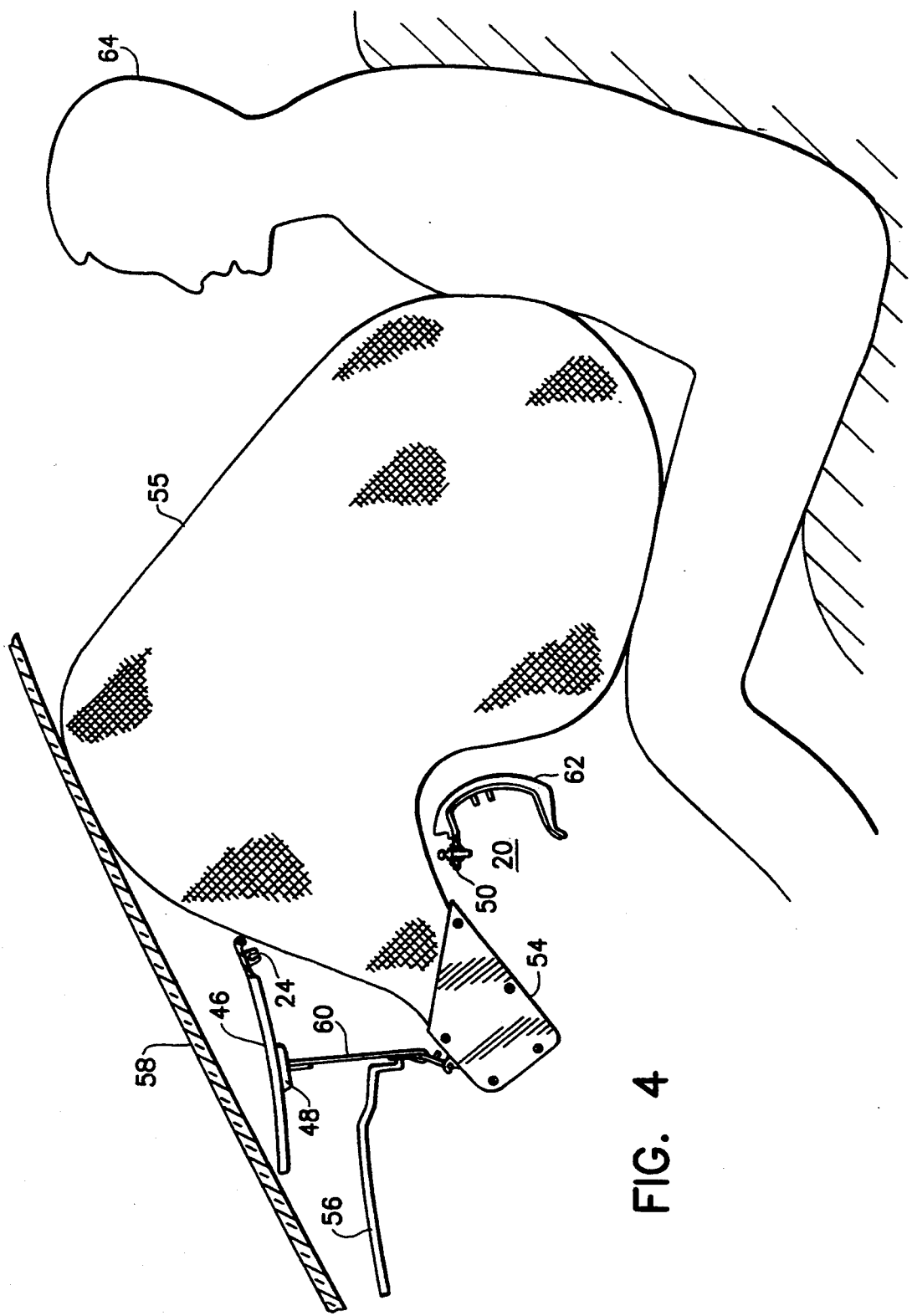
FIG. 4 is a side view of a passenger being restrained by a deployed airbag illustrating the door being released while the fastening means is retained and provides a low profile which does not interfere with the inflatable airbag.

Referring now to FIG. 1, an airbag cover door substrate 10 has a wall 12 extending therefrom containing a channel 14. The channel 14 has a slot 16 extending through an outer extremity thereof exposing shelves 18 on the inside of the channel 14 thereby providing a slotted channel 14 which is open at each end thereof.

The channel 14 is adapted to receive an H-rib fastening means, referred to generally with the referenced numeral 20, which is adapted to slide into either end of the channel 14 and to be retained therein until released in a manner which will be described hereinafter. The H-rib fastening means 20 has an H-shaped head 22 with outer ridges 23 thereon and an intermediate wall 26 terminated in flanges 28. The H-rib fastening means 20 is slotted at 24 on both ends through the H-shaped head 22, the intermediate wall 26 and the flanges 28. The slots 24 provide flexibility to the H-shaped head to enable the compression of ridges 23 for facilitating the insertion of head 22 in channel 14. The H-rib fastening means 20 terminates in a shank 30 having an opening 31 therein. The shank 30 is enclosed by sidewalls 32. The channels 14 may be molded of plastic integral with the door forming a cover closure for an airbag assembly as will be explained. The H-rib fastening means 20 may also be of molded plastic and is designed to slide in either end of the channel 14 in the door substrate and to be detachably removed therefrom in a manner described hereinafter. The ridges 23 on the head 22 restrict lateral movement when the head 22 is mounted in a channel 14.

The H-rib fastening means 20 is adapted to releasably hold the closure door of an airbag assembly in an instrument panel utilizing a resilient clip means, such as a metal fastener 34, having a pair of flanges 36 carrying legs 38 which extend therefrom and contain opposed outwardly extending ridges 40 thereon. The legs 38 are joined by an interconnecting wall 42. The legs 38 of the metal clip fastener 34 have spring feet 44 bent inwardly from the interconnecting wall 42 which feet are adapted to engage the shank 30 of the H-rib fastening means 20 when positioned thereon so that the metal fastener 34 cannot pull off of the H-rib fastening means once it is positioned thereon. The spring feet 44 have inwardly extending V-shaped notches 45 which engage opening 31 in the shank 30 for providing the necessary engagement. The sidewalls 32 on the shank 30 facilitate positioning of the metal fastener 34 on the H-rib fastener 20 as well as restricting lateral movement of the fastener 34 thereon.

FIG. 2 shows the door substrate 10 mounted on an instrument panel substrate 50 having mounting holes 52 therein. The metal clip fastener 34 is positioned on the shank 30 between the sidewalls 32 thereby restricting lateral movement and properly positioning the clip fastener 34 on the H-rib fastening means 20. The H-shaped head 22 is then slipped in the channel 14 which has been molded in the substrate 10. The metal clip fastener 34 is then inserted into the hole 52 of the instrument panel substrate 50 and snapped into place with the outwardly opposed ridges 40 of the legs 38 of the metal clip fastener 34 being squeezed inwardly through the opening 52. The clip fastener 34 snaps in position securing the clip fastener to the substrate 50 thereby locking the H-rib fastening means 20 and the door 10 to which it is attached into place on the instrument panel mounting substrate 50. The ridges 40 of the flexible metal clip fastener 34 engage the underside of the substrate 50 locking the fastener in position on the substrate. The clip fastener 34 is also locked in position on the shank 30 of the H-rib fastening means 20 by the upwardly extending and inwardly biased spring feet 44 carrying V-shaped notches 45 which engage the opening 31 in the shank 30 and hold the clip fastener 34 therein. It should be noted that the H-rib fastening means 20 and the metal clip fastener 34 can be removed from the instrument panel 50 by pressing the legs 38 of the clip fastener 34 together to release the H-rib fastening means 20 from the holes 52 in the instrument panel 50.

The detachable H-rib fastening means described above is primarily used for passenger side airbags with a floating or tethered cover. A plurality of fasteners are employed. FIG. 3 illustrates one arrangement in which a cover door 46 having the integral substrate 10 includes a plurality of channels 14 molded therein, which in the illustrated embodiment are six in number. Tethering mounting means 48 may also be provided on the backside of the door 46 on the substrate 10. An H-rib fastening means 20 as described hereinbefore is inserted into each of channels 14 and then will be secured into holes 52 by clip means 34 as shown in FIG. 3.

FIG. 4 illustrates the deployment of an airbag system employing the fastener arrangement of the present invention. An airbag module 54 is mounted under the dashboard 56 positioned under a windshield 58. A tether means 60 is mounted on one end thereof to the airbag module 54 and on the other into the tethering mounting means 48. The instrument panel 62 with its substrate 50 contains the H-rib fastening means 20. In operation, the H-rib fastening means 20 are slid into place in the channels 4 on the substrate 10 of the door 46. The H-rib fastening means 20 has the metal clip fasteners 34 mounted thereon and which cannot pull off of the rib due to the feet 44 and V-shaped notches 45 thereon. The metal clip fasteners 34 are snapped into the mounting holes 52 in the instrument panel substrate 50 and are locked into place. The tethering means 60 is attached to the tethering mounting means 48 on the door 46. Upon deployment, the airbag 55 is inflated for restraining the seated passenger 64. The H-rib fastening means 20, due to pressure on the rear surface of the door 46 from the inflated airbag, is pulled away from and out of the channels 4 in the door 46 leaving only a low profile channel 4 on the door 46 and a low profile H-rib fastening means 20 on the instrument panel 62, neither of which interfere with the deployment of the airbag 55. The tethered door 46 floats above the dashboard 56 free of the inflated airbag 55.

Not only does the fastening means not interfere with the deployment, the metal clip fastener 34 on the H-rib fastening means 20 may be pressed together to release it from the instrument panel 62 to service the airbag module 54. Also, this fastening arrangement may be reusable by replacing a spent airbag module with a new one and reattaching the door 46 using the H-rib fastening means 20 to cover a newly inserted airbag module 54.

The snap-in, pulled out detachable H-rib fastener using a metal clip fastener provides a system that is reusable as well as providing access to the airbag module for servicing, if desired. In addition, the removal of the H-rib fastening means from the door eliminates the potential problem for airbag snags and holes caused by the retaining means remaining in the back of the door after separation on deployment of the airbag. The use of the detachable H-rib mounting means also permits a shorter channel to be used thereby enabling deployment without breaking of the channels.

The H-rib fastener and resilient clip means may be formed as an integral unit, such as by insert injection molding the resilient clip means into the detachable H-rib fastener.

Since other modifications and changes varied to fit particular operating requirements and environments, it will be apparent to those skilled in the art that the invention is not limited to the examples chosen for purposes of disclosure and covers all modifications and changes which do not constitute departures from the true spirit and scope of this invention.

We claim:

1. In a vehicular airbag system in which an inflatable airbag is mounted in the instrument panel behind a releasable door which is detachably mounted to the instrument panel by a detachable fastening means, said detachable fastening means comprising:

a plurality of slotted channels extending rearwardly from the back of said releasable door and which are open through a slot through an outer extremity thereof and at each end thereof;

a mounting substrate in said instrument panel having a plurality of holes therein;

a plurality of H-rib fastening means each having an H-shaped head thereon which is adapted to be inserted and slipped into either end of one said channels in said door for the positioning and releasable retention of said of fastening means in said door;

each of said H-rib fastening means having a mounting shank extending downwardly from said H-shaped head and adapted to extend through said slot in an outer extremity of said channel and to fit in a hole in said mounting substrate;

a resilient clip means mounted on the mounting shank of said H-rib fastening means for insertion into one of said holes in said mounting substrate for locking said H-rib fastening means in place in said mounting substrate;

whereby inflation of the airbag causes the H-rib head to release from said channel, thereby freeing said door from engagement with said H-rib fastening means to thereby enable the door to be released from said instrument panel.

2. The detachable fastening means as claimed in claim 1, wherein said clip means has a central gripping means for engaging and holding said clip means on said shank.

3. The detachable fastening means as claimed in claim 2 wherein said gripping means includes a plurality of notches and said mounting shank has an opening therein adapted to receive and hold said notches of said gripping means and thereby said clip means on said shank.

4. The detachable fastening means as claimed in claim 1 wherein said resilient clip means includes a pair of resilient legs with opposed outwardly extending ridges thereon which are adapted to be inserted into one of said holes in said mounting substrate for snapping into and locking said fastening means in said hole and whereby pressing the two spring legs together releases said H-rib fastening means from said instrument panel to present access for servicing.

5. An H-rib fastener for detachable fastening an airbag cover having a rear surface substrate containing a plurality of channels extending therefrom and having a slotted opening through an outer extremity thereof, said channels being open at each end thereof and adapted to receive and position said fastener in a vehicle instrument panel having a mounting substrate with a plurality of holes therein, the fastener comprising:

an H-rib shaped head which is adapted to slide into either end of a channel on said rear surface substrate;

a shank having an opening, said shank extending downwardly from said H-rib shaped head of said fastener and adapted to position said fastener in a hole in said mounting substrate of said instrument panel; and a resilient clip means having engagement means mounted thereon for engagement with said shank to prevent said clip means from pulling off of said shank, said clip means adapted to be inserted into a hole in said mounting substrate along with said shank on which the clip means is mounted for locking said H-rib fastener in place in said instrument panel.

6. The H-rib fastener as claimed in claim 5 wherein said engagement means comprises a plurality of V-shaped notches which are adapted to engage said shank when said resilient clip means is mounted on said shank and said shank has an opening therein adapted to receive said V-shaped notches.

7. The H-rib fastener as claimed in claim 5 wherein said resilient clip means includes a pair of resilient legs with opposed outwardly extending ridges thereon which legs are adapted to be inserted into one of said holes in said mounting substrate for snapping said opposed ridges into engagement with said mounting substrate for holding said H-rib fastener in said substrate.

8. The H-rib fastener as claimed in claim 7 wherein said engagement means on said resilient clip means comprises a plurality of V-shaped notches centrally positioned on spring feet extending between the legs of said resilient clip means for engaging said opening in said shank of said H-rib fastener and holding the resilient clip means on said H-rib fastener.

9. The detachable fastening means as claimed in claim 1 wherein said H-shaped head is slotted on each end thereof to facilitate insertion and removal from said channels in said releasable door.

10. The H-rib fastener as claimed in claim 5 wherein said H-rib shaped head is slotted on each end thereof to facilitate insertion and removal from said channels in said releasable door.

11. The detachable fastening means as claimed in claim 1 wherein said H-shaped head has ridges on ends thereof for restricting lateral movement of said head once positioned in one of said channels.

12. The detachable fastening means as claimed in claim 1 wherein said mounting shank has sidewalls thereon and an opening therein for facilitating the positioning and retention of said resilient fastening means thereon and for restricting lateral movement of said fastening means after being positioned on said mounting shank.

13. An H-rib fastener for detachable fastening an airbag cover having a rear surface substrate containing a plurality of channels extending therefrom and said channels having a slotted opening through an outer extremity thereof, said channels are open at the ends thereof and adapted to receive said fastener for positioning said fastener in a vehicle instrument panel having a mounting substrate with a plurality of holes therein, said fastener comprising:

an H-rib shaped head slotted on each end thereof which is adapted to slide into a channel on said rear surface substrate through either end thereof and said head having ridges on each end thereof;

a shank extending downwardly from said H-rib shaped head of said fastener and adapted to position said fastener in a hole in said mounting substrate of said instrument panel;

said shank having an opening and sidewalls thereon;

a resilient clip means having engagement means mounted thereon for engagement with said shank to prevent said clip means from pulling off of said shank, said clip means adapted to be inserted into a hole in said mounting substrate along with said shank on which the clip means is mounted for locking said H-rib fastener in place in said instrument panel;

said clip means having a pair of resilient legs with opposed outwardly extending ridges thereon, said legs adapted to be inserted into one of said holes in said mounting substrate for snapping said opposed ridges into engagement with said mounting substrate for holding said fastener in said substrate; and said engagement means on said resilient clip means comprising a plurality of V-shaped notches centrally positioned on spring feet extending between said legs of said clip means for engaging said opening in said shank of said H-rib fastener and holding said clip means on said H-rib fastener.

* * * * *

UNITED STATES PATENT AND TRADEMARK OFFICE
CERTIFICATE OF CORRECTION

PATENT NO. : 5,403,034
DATED : April 4, 1995
INVENTOR(S) : Gans et al.

It is certified that error appears in the above-indentified patent and that said Letters Patent is hereby corrected as shown below:

Column, 4, Lines 13, 25, and 26, "4" should be -- 14 --.

Signed and Sealed this

Twenty-seventh Day of June, 1995

Attest:

BRUCE LEHMAN

Attesting Officer     Commissioner of Patents and Trademarks